No. 746,902. PATENTED DEC. 15, 1903.
F. H. TURNER.
VEHICLE WHEEL.
APPLICATION FILED JUNE 23, 1902.
NO MODEL.
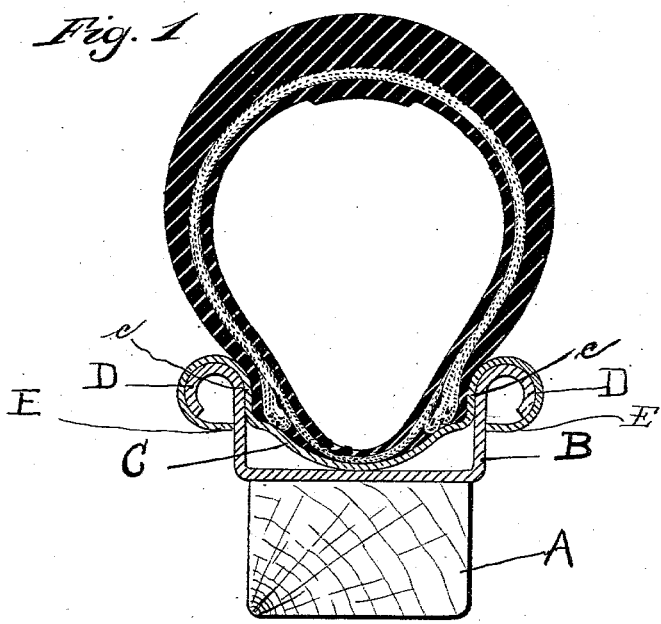
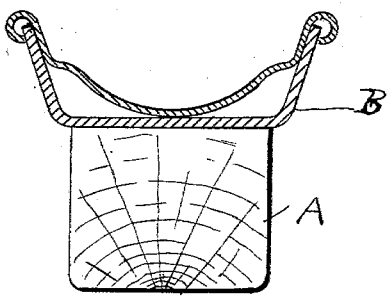
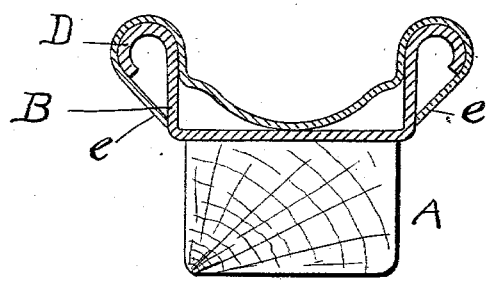
WITNESSES:
C. F. Kilgore
D. H. Keimendahl
INVENTOR.
Frank H. Turner
BY
Simonds Hart
ATTORNEYS.

No. 746,902. Patented December 15, 1903.

UNITED STATES PATENT OFFICE.

FRANK H. TURNER, OF HARTFORD, CONNECTICUT.

VEHICLE-WHEEL.

SPECIFICATION forming part of Letters Patent No. 746,902, dated December 15, 1903.

Application filed June 23, 1902. Serial No. 112,759. (No model.)

*To all whom it may concern:*

Be it known that I, FRANK H. TURNER, a citizen of the United States of America, residing at Hartford, in the county of Hartford and State of Connecticut, have invented certain new and useful Improvements in Vehicle-Wheels, of which the following is a specification.

The object of the improvement is the production of novel and advantageous means whereby rubber tires, notably those of the Dunlop type, may be successfully applied to wheels generally, including wooden wheels used on automobiles. This class of tires requires a support of peculiar contour to receive and support the peculiar form of the outer tube of the tire and hold it in place when the tire is inflated. The heavy work required of wheels used on automobiles makes it desirable that a metal rim of some sort be used in connection with wooden wheels when such a wheel is used.

In the drawings, Figure 1 is a sectional view of a part of a wheel embodying my improvement. Figs. 2 and 3 are similar views of modifications.

The drawings show the outlines of the improvement as applied to a wheel having a wooden felly. The letter A denotes such a wooden felly, its periphery being substantially flat.

The metallic rim comprises an annular base-trough B, having the curved flanges, D, and an annular rim-face C. The edges of the annular base-trough are by preference turned over into semitubular shape. The word "semi" is used in this specification in the sense of "partly." That semitubular shape of the edges of the annular base-trough is shown in Figs. 1 and 2 of the drawings in connection with certain differences of form. The rim-face C, which makes immediate contact with the rubber tire, has two parallel sides or walls c and inward extension from the feet of these walls. The rim-face is united to the base-trough—as, for instance, by having the edges of the rim-face embrace the edges of the base-trough to a degree which holds the two together. The rim-face C has its central portion curved inwardly to form a convex face which contacts with the bottom wall of the base-trough B, the outer ends of which curved portion terminate in vertical walls lying parallel and engaging the side walls of the said trough, and then being curved outwardly in opposite directions to snugly embrace the adjacent portions of the trough, as clearly illustrated. When the parts of this metallic rim are formed and assembled, it is dipped in a brazing solution, which is permitted to flow to every point of contact of the two pieces, thus securing them together as a practically integral structure. It will be readily understood that the sides of the metallic rim, considered as a whole, are strengthened by being made double at the upper part and also, by preference, by making the duplicated parts semitubular in shape.

In lieu of having the portions E of the rim-face C curved, as shown in Figs. 1 and 2 of the drawings, I may form the same straight, as at e. (Illustrated in Fig. 3 of the drawings.)

By making the inner periphery of the metallic rim (considered as a whole) substantially flat it can be shrunk upon the flat face of the wooden felly of a wheel in the ordinary manner, and it may be still further secured to the felly by additional means, if desired.

I claim as my invention—

In combination with the rim, a base-trough mounted on said rim and comprising a bottom and vertically-disposed side walls, and an annular rim-face arranged in the said base-trough, and being provided with a convex central portion engaging the bottom of the said base-trough, the outer end of said convex portion extending upwardly in parallel planes and engaging the side walls for the entire length of the said vertically-disposed portion and then being bent over the upper ends of the side walls of the said base-trough, substantially as described.

In testimony whereof I affix my signature in presence of two witnesses.

FRANK H. TURNER.

Witnesses:
 FRANKLIN KESSER,
 W. H. KIRKPATRICK.